Dec. 9, 1930.                H. C. GOHLKE                  1,784,688
                                  BRAKE
                          Filed Dec. 23, 1927
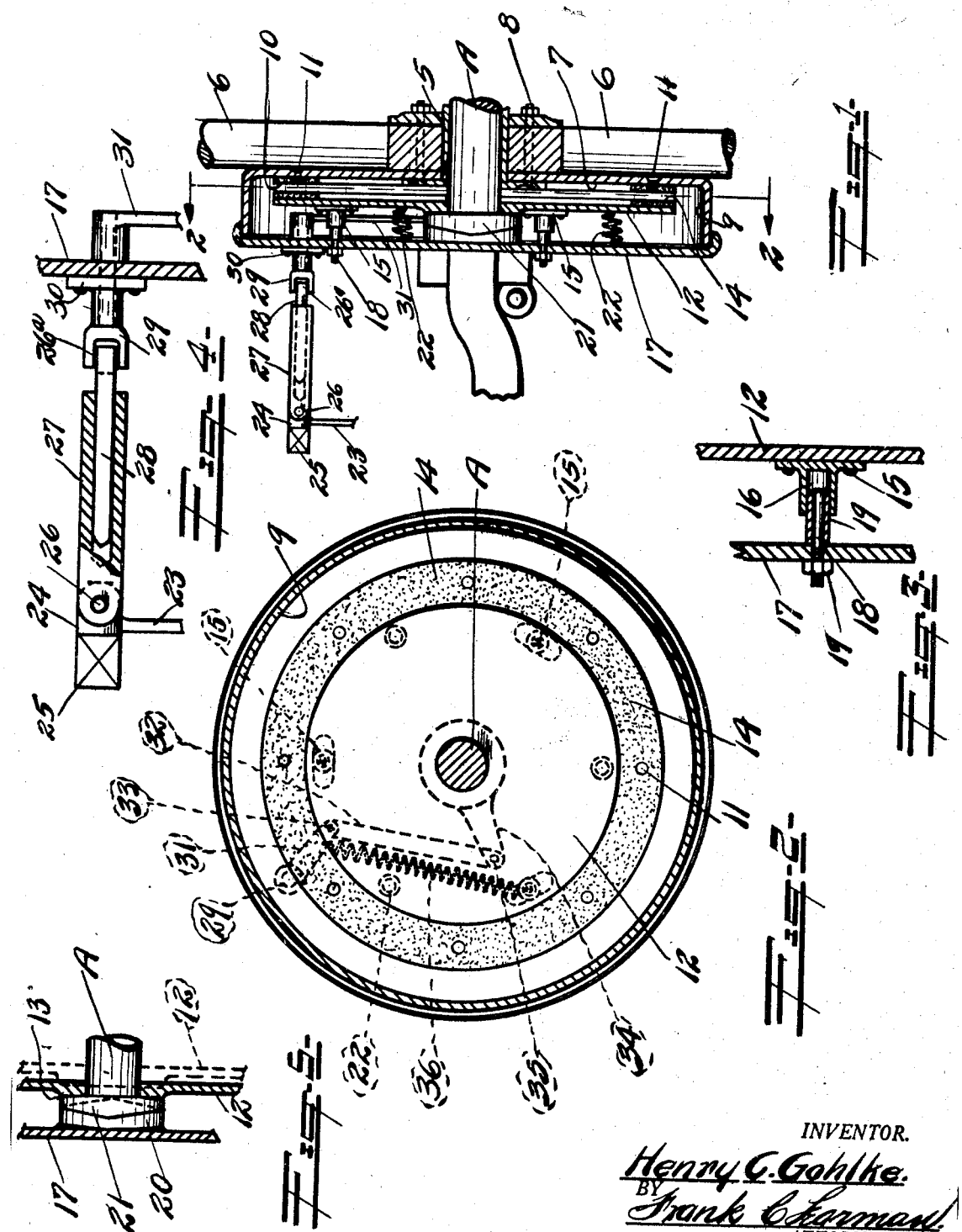
INVENTOR.
Henry C. Gohlke.
BY
Frank C. Farman
ATTORNEYS.

Patented Dec. 9, 1930

1,784,688

UNITED STATES PATENT OFFICE

HENRY C. GOHLKE, OF PORT HOPE, MICHIGAN

BRAKE

Application filed December 23, 1927. Serial No. 242,030.

This invention relates to friction brakes for motor vehicles and the like and particularly to a brake composed of disc shaped friction members, and resilient means for normally holding the friction surfaces out of engagement with each other.

The prime object of the invention is to provide a disc shaped brake of very simple design, which is applicable for hydraulic or mechanical operation, which can be very quickly removed and replaced, and which is simple and economical to manufacture.

Another object of the invention is to provide a brake composed of few parts; which will not freeze or lock, and which can be applied to the front as well as the rear wheels.

A further object is to design a brake composed of spaced apart rotatable and non-rotatable disc shaped members, and provide simple and substantial means for shifting one into engagement with the other, and resilient means for automatically disengaging said disc shaped members when the pressure is relieved from the brake pedal.

With the above and other objects in view, the present invention consists in the combination and arrangement of parts, hereinafter more fully described, illustrated in the accompanying drawing, and particularly pointed out in the appended claims, it being understood that changes may be made in the form, size, proportion, and minor details of construction, without departing from the spirit or sacrificing any of the advantages of the invention.

In the drawings—

Fig. 1 is a sectional view of a conventional wheel showing my improved brake attached thereto.

Fig. 2 is a transversely disposed section taken on the line 2—2 of Fig. 1.

Fig. 3 is an enlarged fragmentary sectional view illustrating the mounting of the disk on the plate.

Fig. 4 is an enlarged part sectional view of the flexible extendible shaft connection.

Fig. 5 is a detail view showing the shifter sleeve, the dotted lines showing it in shifted position.

I am of course aware that other brakes of a similar design have been conceived, but these are all too complicated, cannot be attached to all four wheels, are expensive to manufacture, and frequently get out of adjustment, and these disadvantages I have overcome in my improved design.

Referring now particularly to the drawing, the numeral 5 indicates the hub of the front wheel of a motor vehicle, which is provided with the usual spokes 6, a spindle A projecting through this hub and on which the wheel is mounted.

The wheel can be either of a disc design, or the wood wheel shown in the present instance. In this design I provide a casing 7 which is secured to the wheel proper by means of bolts 8 or the like, and is rotatable therewith, the outer edge being flanged as shown at 9, and a disc shaped strip of brake lining 10 is riveted to the inner face of the casing by means of rivet 11.

An annular disk shaped member 12 is spaced from the casing, and is formed with a hub 13 having a centrally disposed opening for accommodation of said spindle, a strip of brake lining 14, (similar to that shown at 10), being riveted to the face thereof, and in position to register with and engage the member 10 when the brakes are applied. Spaced apart bearings 15 are bolted to the back of the disk member 12, and are centrally bored as shown at 16, and for a purpose to be presently described.

A nonrotatable plate 17 forms an end closure for the brake, the outer periphery thereof being turned to embrace and cover the end of the flange 9, forming a weatherproof running joint thereat, a hub 20 is provided on the plate 17, the edge thereof being cam shaped, said edge engaging a similar edge formed on the shifter sleeve 21, which is rotatably mounted on the spindle A so that rotation of the said sleeve will bring the high spots on the cam shaped edges of the members 20 and 21 into abutting relation, and shift the member 12 longitudinally on the spindle, as clearly shown in Fig. 5. of the drawing, the said member being returned to normal position by means of spaced apart springs 22, anchored to the members 12 and 17 respectively.

Spaced apart studs 18 are mounted on the plate 17 in horizontal alinement with the bearings 15, one end being slidably mounted in a spacer 19 which projects into the bearing, the opposite end being threaded to receive a nut 19 in the usual manner.

The brake operating mechanism comprises a crank lever 23 formed integral with shaft 24, said shaft being mounted in a bearing 25 provided on the vehicle, one end of said shaft being shaped to form one half of a universal joint 26, the opposite half of the universal joint being formed on the end of a sleeve 27, having a squared opening therein, adapted to receive the squared shaft 28 and form a slip joint, another universal joint 26ª is formed by the ends of the members 28 and 29 respectively, the shank of the member 29 being journaled in a bearing 30, which is secured to the end plate and projects therethrough, and a crank lever 31 is keyed thereon. One end of a link 32 is pivotally secured to the free end of the crank lever 31 by means of a pin 33, the opposite end being pivotally secured to an arm 34 which is cast integral with the shifter sleeve, 21, by means of the bolt 35, a coiled spring 36 being anchored to the lever 31 and bearing 15 respectively, to pull the mechanism back to original position.

The crank lever 23 is suitably connected to a brake lever in the conventional manner, and it will be obvious that actuation of the brake lever will rotate the shifter sleeve 21 on the shaft, forcing the member 12 longitudinally on the spindle, so that the brake lining 14 engages with the brake lining on the casing 7 and applies the brakes.

The slip joint 28 and universal joints 26 and 26ª respectively, provide for the necessary range of movements of the wheel with relation to the vehicle frame.

From the foregoing description it will be obvious that I have perfected a very simple economical and effective brake for automotive vehicles.

What I claim is:—

1. A friction brake for automotive vehicles comprising a non-rotatable plate, a rotatable casing having a friction disc secured thereto, studs mounted on said plate in spaced apart relation, a disk, bearings on said disk and in which the studs are slidably mounted, a friction element secured to said disk, a shifter sleeve interposed between said plate and casing, means for rotating said sleeve to shift said friction disk into engagement with said friction casing, and including a longitudinally extendible shaft having universal joints at the ends thereof, and means for connecting said plate and disc.

2. A friction brake for automotive vehicles comprising a non-rotatable plate, having a hub formed with a cam shaped edge, a rotatable casing spaced therefrom and having a friction disc secured thereto, inwardly projecting lugs on the said plate, a disk mounted thereon, bearings on said disk and in which the ends of the lugs are slidably mounted, a friction element on said disk, a shifter sleeve interposed between said plate and casing and formed with a hub having a cam shaped edge, means mounted on said plate for rotating said shifter sleeve, and including a longitudinally extendible shaft having universal joints at the ends thereof, and resilient means for connecting said plate and disk.

In testimony whereof I hereunto affix my signature.

HENRY C. GOHLKE.